(12) United States Patent
Werner et al.

(10) Patent No.: US 10,883,472 B2
(45) Date of Patent: Jan. 5, 2021

(54) BUSHING FOR A WIND TURBINE ROTOR BLADE, FLANGE INSERT, WIND TURBINE ROTOR BLADE AND WIND TURBINE

(71) Applicant: Nordex Energy GmbH, Hamburg (DE)

(72) Inventors: Markus Werner, Felde (DE); Tim Berend Block, Henstedt-Ulzburg (DE)

(73) Assignee: NORDEX ENERGY GMBH, Hamburg (DE)

( * ) Notice: Subject to any disclaimer, the term of this patent is extended or adjusted under 35 U.S.C. 154(b) by 23 days.

(21) Appl. No.: 16/372,157

(22) Filed: Apr. 1, 2019

(65) Prior Publication Data
US 2019/0316564 A1 Oct. 17, 2019

(30) Foreign Application Priority Data
Apr. 16, 2018 (EP) ..................... 18167560

(51) Int. Cl.
*F03D 1/06* (2006.01)

(52) U.S. Cl.
CPC ...... *F03D 1/0658* (2013.01); *F05B 2240/221* (2013.01); *F05B 2250/60* (2013.01)

(58) Field of Classification Search
CPC .............. F03D 1/0658; F05B 2240/221; F05B 2250/60
See application file for complete search history.

(56) References Cited

U.S. PATENT DOCUMENTS

| | | | | |
|---|---|---|---|---|
| 2,984,453 A | * | 5/1961 | Heyman | F01D 5/16 416/229 R |
| 4,360,288 A | * | 11/1982 | Rutledge, Jr. | E21B 17/04 403/268 |
| 4,915,590 A | * | 4/1990 | Eckland | F03D 1/0658 29/889.21 |
| 7,163,378 B2 | * | 1/2007 | Kildegaard | B29C 70/525 416/230 |
| 8,172,538 B2 | * | 5/2012 | Hancock | F03D 1/0675 416/204 R |

(Continued)

FOREIGN PATENT DOCUMENTS

| | | |
|---|---|---|
| DE | 102011051172 | 12/2012 |
| DE | 102014008558 | 12/2015 |

(Continued)

*Primary Examiner* — Christopher Verdier
*Assistant Examiner* — Theodore C Ribadeneyra
(74) *Attorney, Agent, or Firm* — Lathrop GPM, LLP

(57) ABSTRACT

A bushing (116) for a wind turbine rotor blade (104) is provided, the bushing (116) comprising a first bushing end (117) and an opposite second bushing end (118) and a bushing bore (119) which extends in a region between the first bushing end (117) and the second bushing end (118) and comprises a bore longitudinal axis (120); wherein, along the bore longitudinal axis (120) in the direction of the second bushing end (118), the bushing bore (119) comprises a threaded portion (127), and wherein the bushing (116) comprises a bushing runout (128) that follows the threaded portion (127), the bushing runout comprising a widening portion (131) of the bushing bore (119), in which a diameter (132) of the bushing bore (119) enlarges at least monotonically while an increase in diameter decreases at least monotonically.

14 Claims, 4 Drawing Sheets

(56) References Cited

U.S. PATENT DOCUMENTS

Figure 1:
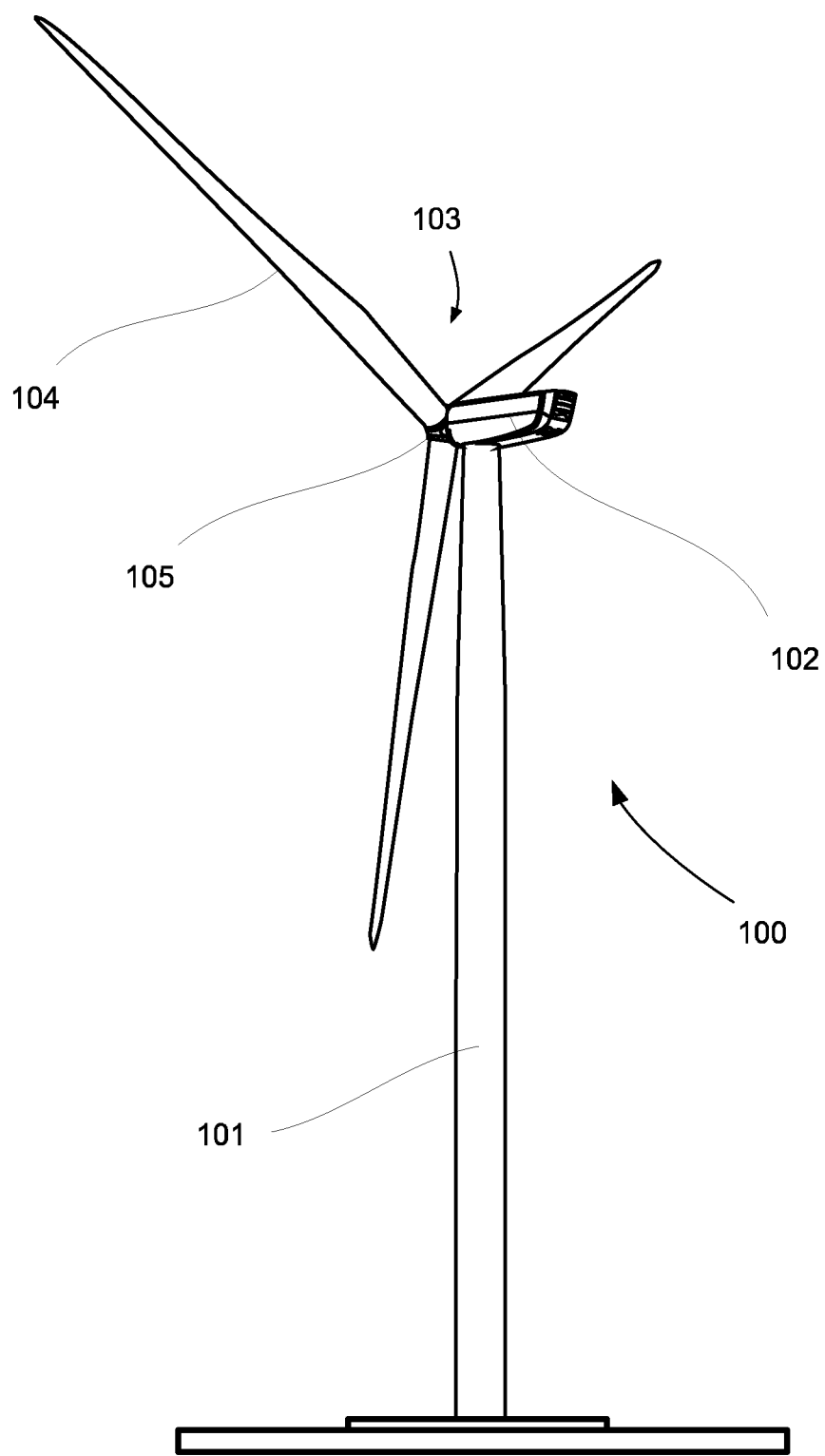

| | | | | |
|---|---|---|---|---|
| 8,727,731 | B2* | 5/2014 | Bendel | B23P 15/04 |
| | | | | 15/4 |
| 9,458,822 | B2* | 10/2016 | Feigl | F03D 1/06 |
| 9,790,918 | B2* | 10/2017 | Feigl | F03D 1/0658 |
| 9,957,953 | B2* | 5/2018 | Kratmann | F03D 1/0658 |
| 10,024,298 | B2* | 7/2018 | Kratmann | F03D 1/0658 |
| 10,087,911 | B2* | 10/2018 | Feigl | F03D 1/0658 |
| 10,190,571 | B2* | 1/2019 | Samudrala | F03D 1/0658 |
| 2001/0008854 | A1* | 7/2001 | Costain | F16B 7/182 |
| | | | | 473/46 |
| 2005/0106029 | A1* | 5/2005 | Kildegaard | F03D 1/0658 |
| | | | | 416/229 R |
| 2011/0044817 | A1* | 2/2011 | Bendel | F03D 1/0658 |
| | | | | 416/204 R |
| 2011/0142657 | A1* | 6/2011 | Jacobsen | F03D 1/0658 |
| | | | | 416/204 R |
| 2012/0045343 | A1* | 2/2012 | Hancock | B29D 99/0028 |
| | | | | 416/226 |
| 2015/0354531 | A1* | 12/2015 | Kratmann | F03D 1/0658 |
| | | | | 416/204 A |
| 2017/0045032 | A1* | 2/2017 | Jacobsen | F03D 1/0658 |
| 2017/0342958 | A1* | 11/2017 | Roura | F16B 31/06 |

FOREIGN PATENT DOCUMENTS

| | | |
|---|---|---|
| EP | 2589796 | 5/2013 |
| EP | 2952739 | 12/2015 |
| WO | WO 2015/124568 | 8/2015 |
| WO | WO 2015/130162 | 9/2015 |
| WO | WO 2017/101943 | 6/2017 |

* cited by examiner

BUSHING FOR A WIND TURBINE ROTOR BLADE, FLANGE INSERT, WIND TURBINE ROTOR BLADE AND WIND TURBINE

The invention relates to a bushing for a wind turbine rotor blade. Moreover, the invention relates to a flange insert, a wind turbine rotor blade as well as a wind turbine.

Wind turbines having rotor blades are widely known from the prior art and are used to convert wind energy into electrical energy. In the region of a rotor blade root, the rotor blades comprise a rotor blade attachment having a plurality of bushings integrated into the laminate, by way of which bushings the rotor blades are connected by means of fastening screws or respectively fastening bolts to a bearing race of a so-called pitch bearing or to a component connected to the bearing ring such as e.g. an extender of the wind turbine. The bushings can be part of a flange insert for the rotor blade attachment. Such a structure is known, for example, from the international application WO 2015/124568 A1.

Alternatively, bushings are also used during the connection of rotor blade segments which, when arranged and assembled lengthwise, form a rotor blade. The bushings are then located in the laminate of a division flange of the rotor blade segments. The rotor blade segments are connected to one another by way of the bushings directly by means of bolts or by way of suitable intermediate pieces.

One object which underlies the invention is to indicate a concept for bushings, which contributes to a particularly reliable operation of a wind turbine.

According to a first aspect, a bushing for a wind turbine rotor blade is disclosed. The bushing comprises a first bushing end which can face, for example, an end of the rotor blade on the root side, and an opposite second bushing end. In an operatively produced condition of a rotor blade having the bushing, the second bushing end faces, for example, a rotor blade tip. The bushing comprises a bushing bore which extends in a region between the first bushing end and the second bushing end and comprises a bore longitudinal axis. Along the bore longitudinal axis in the direction of the second bushing end, the bushing bore comprises a threaded portion. The bushing further comprises, along the bore longitudinal axis in the direction of the second bushing end, a bushing runout that follows the threaded portion, wherein the bushing outlet has a widening portion, in which widening portion a diameter of the bushing bore enlarges at least monotonically while an increase in diameter decreases at least monotonically.

A bushing runout as defined above helps to guarantee a uniform transmission of forces between the bushing and a surrounding fiber-reinforced composite bonded thereto, for instance the laminate, in an operatively produced rotor blade. This results in an increased strength of the construction of the rotor blade. Furthermore, a significant cost increase is avoided during the production of the rotor blade. Thanks to the special configuration of the widening portion, the bushing runout can be adapted to a strength of the bushing, the bonding and the fiber-reinforced composite in such a manner that local overloading is minimized.

It was discovered that the strength of a rotor blade in the region of the rotor blade attachment or respectively of the division flange for rotor blade segments is substantially determined by three factors: 1) the strength of the bushing itself, 2) the strength of a bonding of the bushing to an enclosing fiber-reinforced composite, for instance a laminate, as well as 3) the strength of the fiber-reinforced composite enclosing the bushing.

In regions in which a stiffness of the joining partners bonded to one another changes considerably, very high shear stress loads can have an effect in the bonding. Cracks can occur here, which enlarge rapidly under cyclical loading and lead to a failure of the connection of the bushing to the fiber-reinforced composite. A critical loading exists if a force acting upon the rotor blade extracts the bushing from the fiber-reinforced composite, for instance the laminate. In this case, the force would transfer from the bushing into the fiber-reinforced composite by way of shear stresses in the bonding. For example, stiffness discontinuities are located at the bushing runout.

In addition, the strength of the bushing which is typically produced from steel has a limiting effect. The stresses in the bushing can exceed the permissible strength, in particular in the thin-walled regions. As a consequence, the bushing cracks or respectively breaks and the bonding is overloaded at the breakpoint, because the stiffness discontinuity at the bushing crack is higher than, for example, at the second bushing end on the tip side.

The design of the bushing runout according to the invention makes possible a construction which is suitable for bonding.

In this case, stress flows and permissible stresses in the bushing itself, in the bonding and in the enclosing fiber-reinforced composite of the rotor blade are considered. In the case of the construction according to the invention, the diameter in the widening portion of the bushing runout alters in a non-linear manner, at least in sections. A purely linear course is excluded.

The following applies, both here and below: the bushing runout is the portion of the bushing leading to the second bushing end. The bushing has, for example, a cylindrical configuration. The widening portion is, for example, rotationally symmetrical in cross-section; alternative shapes, for instance elliptical or square, are likewise conceivable. At least monotonically means that a corresponding value or a parameter does not absolutely have to increase or respectively decrease continuously along the bore longitudinal axis, but portions without an increase or decrease can also exist. However, a strictly monotonic increase or respectively decrease is not excluded. The monotonic enlargement of the diameter means that the diameter in the widening portion, viewed in the direction of the second bushing end, absolutely becomes larger and larger, at least in sections, but does not include any portions in which the diameter decreases again. The monotonic decrease in the increase in diameter means that the difference of consecutive diameters of the bushing runout becomes smaller, for instance for each identical distance unit along the bore longitudinal axis, in the direction of the second bushing end. The difference of consecutive diameters can remain the same in sections. The enlargement of the diameter or respectively the reduction in the increase in diameter according to the above conditions is, for example, based at least on one segment of the bushing runout with respect to the bore longitudinal axis, or is fulfilled at least between two points of the widening portion with respect to the bore longitudinal axis.

In other words, the diameter in the widening portion can be described by a function which depends on a value x, wherein x describes the distance along the longitudinal axis starting from a start of the widening portion. This function rises monotonically along the entire widening portion, while the discharge decreases monotonically in accordance with x.

For example, the following forms are conceivable for the bushing runout which cannot have, for example, a conical and, consequently, linear course: champagne glass form, hyperbolas, polynomials, exponential functions and combinations as well as free forms, and splines. Likewise, an approximation to one of the indicated forms by means of gradually straight lines (linear course portions) which are connected to one another, either directly or by transition radii, is possible.

According to one embodiment, the diameter in the widening portion enlarges in such a manner that the bushing runout comprises an arc-shaped course in the widening portion. As a result, the bushing bore comprises a contoured, that is to say curved or curvilinear, course along the bore longitudinal axis in the widening portion. In other words, an inner contour of the bushing of the widening portion is formed with a contoured course. In other words again, an inner contour/bore wall is formed with a contoured course in the cross-section of the bushing of the widening portion. For example, the bore in the widening portion is configured in a rotary paraboloidal form. In other words, the diameter enlarges strictly monotonically, while the increase in diameter decreases strictly monotonically. The course is, for example, steady, but can also be approximated by linear interpolation.

According to one embodiment, the bushing comprises, at least in the region of the widening portion, preferably in the region of the bushing runout, a substantially constant outside diameter. This contributes to the advantages and functions indicated above. This substantially includes embodiments, in which the outside diameter is constant over the entire distance in the region of the widening portion. However, embodiments are also included, in which the bushing comprises, in the region of the widening portion, elevations and/or indentations externally and the outside diameter therefore varies slightly. On average, a deviation from a constant outside diameter is not more than 5 to 10%.

According to one embodiment, the diameter in the widening portion enlarges in such a manner that a wall thickness of the bushing decreases constantly on a percentage basis along the widening portion in the direction of the second end. For example, the wall thickness tapers in a non-linear manner in this region. In particular, a particularly optimized design of the bushing is produced in combination with the above-mentioned constant outside diameter. The percentage decrease is, in turn, based on the bore longitudinal axis. Similarly to above, the decrease in the wall thickness is based on two consecutive, equally large, segments of the widening portion or respectively equidistant points along the bore longitudinal axis. Viewed on a percentage basis, the decrease is constant. By implication, this means that the absolute decrease in the wall thickness always becomes smaller in the direction of the second end. In other words, a difference of wall thicknesses reduces along the bore longitudinal axis in the direction of the second bushing end.

According to one embodiment, the diameter in the widening portion enlarges in such a manner that a cross-sectional area of the bushing decreases constantly on a percentage basis along the widening portion in the direction of the second bushing end. In particular, a particularly optimized design of the bushing is produced in combination with the above-mentioned constant outside diameter. The percentage decrease, is, in turn, based on the bore longitudinal axis. The decrease in the cross-sectional area is defined similarly to above.

According to one embodiment, the widening portion forms at least 50%, in particular at least 60%, at least 70%, at least 80% or at least 90%, of the bushing runout. The percentages are, in turn, based on the bore longitudinal axis.

For example, a radius portion and/or a cylindrical portion can follow the bushing bore between the threaded portion and the widening portion.

According to one embodiment, a wall thickness of the bushing increases at least partially between the first bushing end and the threaded portion. As a result, a stiffness discontinuity can be avoided or reduced in the region of the first bushing end in the case of an operatively produced rotor blade having a bushing. Alternatively, the wall thickness can also decrease in this region. The first end of the bushing is then widened in order to decrease the surface pressure with respect to the opposite component.

According to one embodiment, a circumferential chamfer or a circumferential radius is configured on the second bushing end. The chamfer or the radius serves to produce a structurally improved bushing end, as a result of which a tendency to delaminate at this point is reduced.

According to one embodiment, the bushing is produced in one piece.

According to one embodiment, the bushing bore extends continuously from the first bushing end to the second bushing end. A continuous bushing bore facilitates the production of the bushing. Alternatively, the bore can also be interrupted at one point of the bushing. In this case, there are two bores which each extend from one bushing end into the bushing, are situated on the same bore longitudinal axis and are separated from one another by a barrier. This barrier can be located, for example, between the threaded portion and the bushing runout. Such an embodiment is, in particular, advantageous during the infusion, since the possibility of infusion resin penetrating the threaded portion can be excluded.

According to a second aspect, a flange insert for a wind turbine rotor blade is disclosed. The flange insert comprises multiple bushings arranged next to one another according to one of the above embodiments, wherein the bushings are embedded in one or more laminate layers. When the flange insert is used for the rotor blade attachment, the bushings are arranged next to one another in a circle or in the form of a circular segment. When the flange insert is used for the connecting flange of a rotor blade segment, the bushings can be arranged next to one another such that they follow the course of the blade contour.

According to a third aspect, a wind turbine rotor blade is disclosed, which comprises a rotor blade attachment having multiple bushings arranged in a circle according to one of the above embodiments.

According to a fourth aspect, a wind turbine rotor blade is disclosed, which comprises a rotor blade segment having a connecting flange having multiple bushings arranged next to one another according to one of the above embodiments.

According to a fifth aspect, a wind turbine is disclosed, which comprises a rotor having one or more rotor blades according to the embodiment described above.

The flange insert, the wind turbine rotor blade and the wind turbine make possible the aforementioned advantages and functions.

Figure 2:
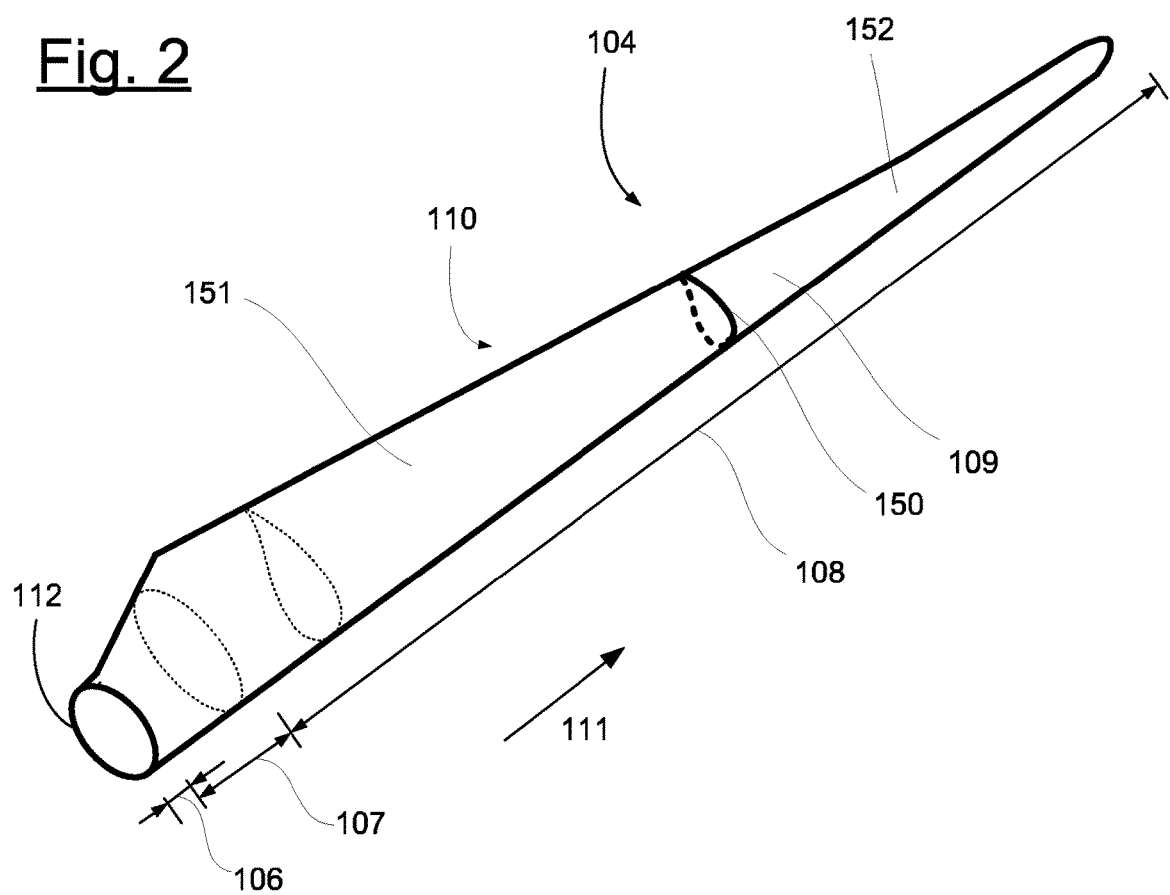
Figure 3:
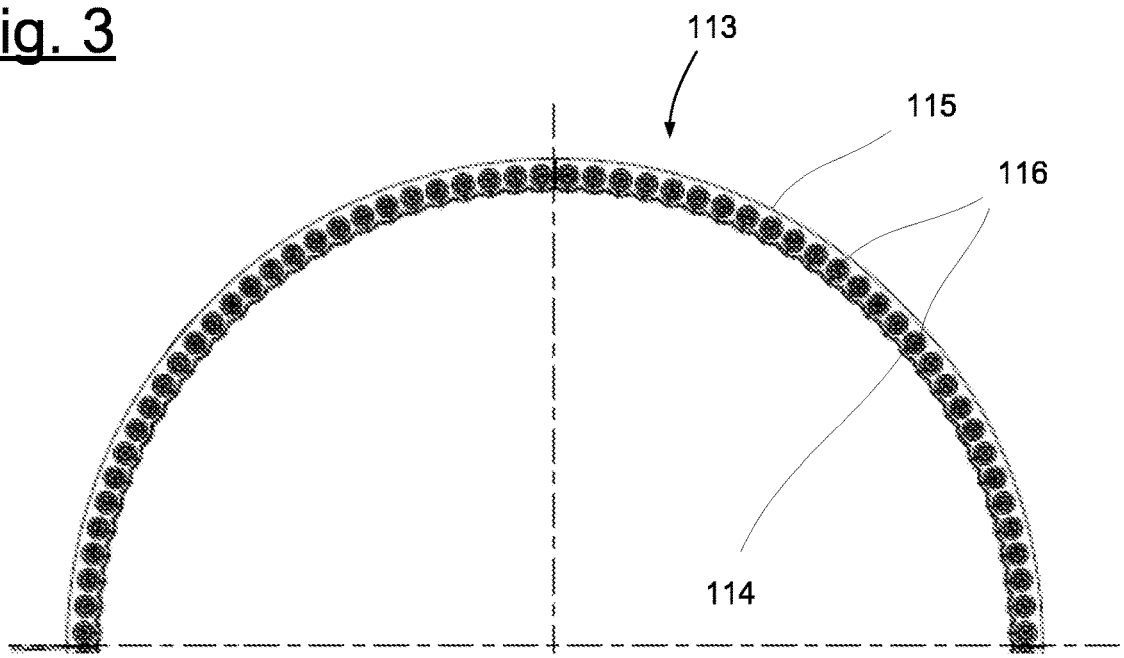
Figure 4:
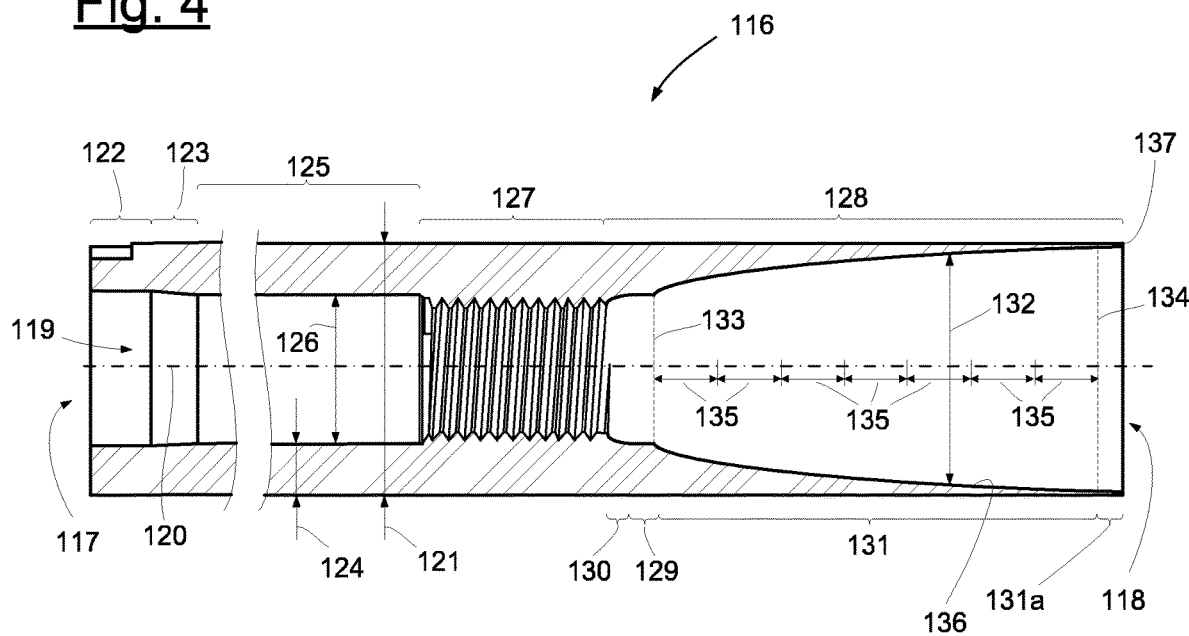
Figure 5:
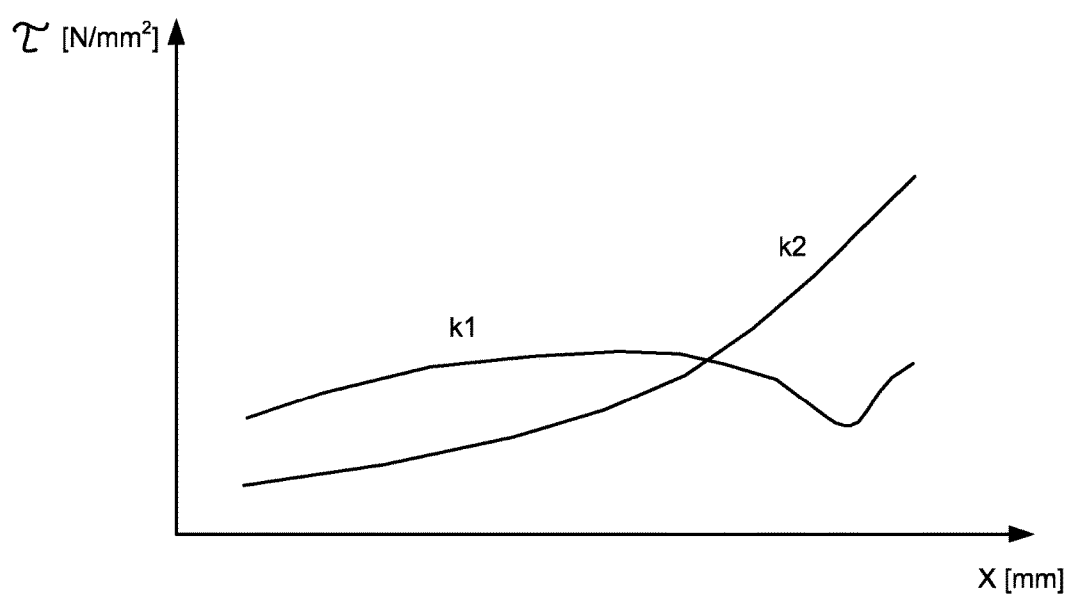
Figure 6:
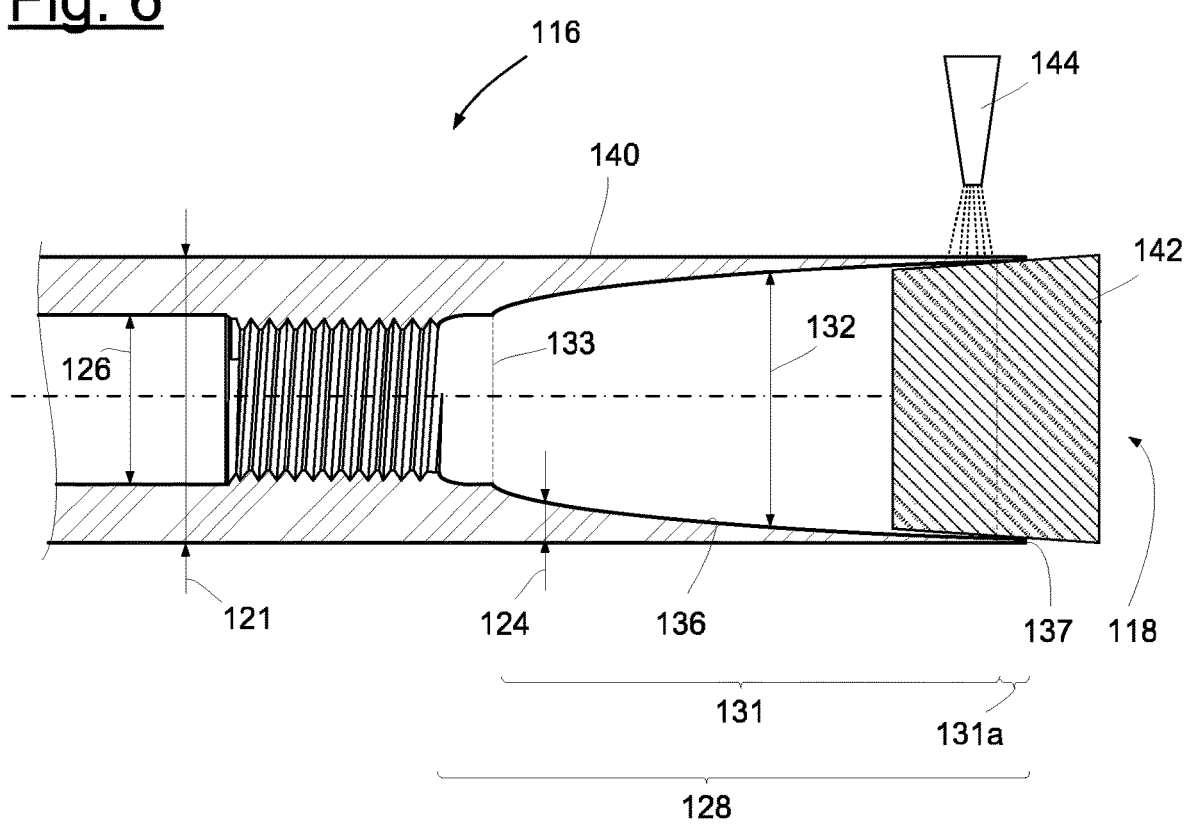

Further advantages, features and further developments are set out by the following embodiment examples which are explained in conjunction with the figures. The same or similar elements or elements acting in the same way are provided with the same reference numerals in the figures, wherein:

FIG. 1 shows a schematic representation of a wind turbine according to one embodiment example, FIG. 2 shows a schematic representation of a wind turbine rotor blade, FIG. 3 shows a schematic representation of a flange insert for the rotor blade, FIG. 4 shows a schematic cross-sectional view of a bushing of the rotor blade according to one embodiment example of the invention, FIG. 5 shows a shear stress flow of the bushing according to the embodiment example compared with a conventional bushing in a schematic diagrammatic view, and FIG. 6 shows a tool for producing the bushing according to the invention.

FIG. 1 shows a schematic representation of a wind turbine 100 according to one embodiment example. The wind turbine 100 comprises a tower 101. The tower 101 is fastened by means of a foundation to a substratum. A nacelle 102 is rotatably mounted on one end of the tower 101, which is located opposite the substratum. The nacelle 102 comprises, for example, a generator which is coupled by way of a rotor shaft (not shown) to a rotor 103. The rotor 103 comprises one or more rotor blades 104 which are arranged on a rotor hub 105.

The rotor 103 is made to rotate during operation by an air current, for example wind. This rotational movement is transferred by way of the rotor shaft and, if applicable, a gearbox to the generator. The generator converts the kinetic energy of the rotor 103 into electrical energy.

FIG. 2 shows one exemplary rotor blade 104 of the wind turbine 100. The rotor blade 104 has the form of a conventional rotor blade and has a rotor blade root region 106 which faces, and is assigned to, the rotor hub 105. The rotor blade root region 106 typically has a substantially circular cross-section.

A transition region 107 and a profile region 108 of the rotor blade 104 are joined to the rotor blade root region 106. The rotor blade 104 has a pressure side 109 and an opposite suction side 110 with respect to a longitudinal extension direction 111. The rotor blade 104 has a substantially hollow configuration internally.

A rotor blade attachment 112, by means of which the rotor blade 104 is mechanically connected to the rotor hub 105, is provided in the rotor blade root region 106.

The rotor blade 104 comprises a division point 150, at which a rotor blade segment 151 on the blade root side and a rotor blade segment 152 on the blade tip side are connected to one another by way of division flanges.

A flange insert 113 is typically provided in order to manufacture the rotor blade attachment 112. Said flange insert is a laminate 114 and 115 on the inner side and outer side of an arc, in which bushings 116 having threads are embedded in the longitudinal extension direction 111. The bushings 116 are, for example, metal bushings, in particular steel bushings. A semicircular segment is shown in FIG. 3. Initially, the flange insert 113 is produced, wherein the bushings 116 are arranged in a circle at fixed distances from one another, for instance by means of spacer elements. The laminates 114 and 115 as well as the bushings 116 are subsequently sealed in an air-tight manner and infused with a matrix material, for instance epoxy resin. In a further step, the flange insert 113 is inserted, for example, into a main form in order to produce a rotor blade shell and connected to further chamfer layers.

However, it is also conceivable that no flange insert 113 is provided and the bushings 116 are embedded directly in the laminate of the rotor blade 104, for instance in rotor blade half-shells.

Similarly, the two rotor blade segments 151 and 152 connected by way of bushings with or without flange inserts.

It should be mentioned at this point that the configuration of the rotor blade 104 by means of the rotor blade segments 151 and 152 and the division point 150 connected thereto is optional. It is also possible that the rotor blade 104 is not segmented over the longitudinal extension direction 111.

FIG. 4 shows a bushing 116 according to one embodiment example of the invention.

The bushing 116 according to FIG. 4 has a first bushing end 117 and an opposite second bushing end 118. The bushing 116 has a cylindrical form and has a continuous bushing bore 119 which extends from the first bushing end 117 to the second bushing end 118. The bushing bore 119 has a bore longitudinal axis 120 which can also be deemed to be the longitudinal axis of the bushing 116. The bushing 116 has a constant outside diameter 121 and is formed rotationally symmetrical.

Starting from the first bushing end 117, the bushing bore 119 has—always based on the bore longitudinal axis 120 both here and below—a first portion 122 which has a cylindrical configuration. Joined to the first portion 122 is a second portion 123, in which the wall thickness 124 of the bushing 116 enlarges or respectively the inside diameter 126 of the bushing bore 119 reduces. Joined to the second portion 123 is a third portion 125 which again has a cylindrical configuration, however with a reduced inside diameter 126 compared to the first portion 122. Joined to the third portion 125 is a threaded portion 127, wherein the bushing bore 119 comprises an inner thread. The threaded portion 127 is followed by the so-called bushing runout 128. The bushing runout 128 relates to a portion of the bushing 116 up to the second bushing end 118, in which the inside diameter 126 and, correspondingly, the wall thickness 124 of the bushing 116 are modified as described below.

The bushing runout 128 comprises an optional cylindrical portion 129 which is connected to the threaded portion 127 (threaded undercut) by means of an optional radius portion 130. Finally, the bushing runout 128 substantially comprises a widening portion 131 which makes up more than 80% of the entire bushing runout 128—with respect to the bore longitudinal axis 120. Shortly before the second bushing end 118, the widening portion 131 optionally merges with a further cylindrical portion 131a.

The bushing runout 128 is configured in the widening portion 131 such that an (inside) diameter 132 of the bushing bore 119 enlarges strictly monotonically from a start 133 of the widening portion 131 up to an end 134 of the widening portion 131. The enlargement of the diameter 132 is, in addition, subject to the condition that the absolute increase in diameter decreases strictly monotonically. These two conditions for the diameter 132 are fulfilled between the start 132 and the end 134, based on the bore longitudinal axis 120. In the embodiment example, the widening portion 131 is subdivided into segments 135, which do not absolutely have to be the same length, along the bore longitudinal axis 120, wherein the conditions are fulfilled for each segment 135, but also across two segments. The size and number of the segments 135 of the widening portion 131 can be freely defined. The segments 135 are connected to one another by radii. This produces a non-linear course of the diameter 132. As a result, in the cross-section shown according to FIG. 4, the course of a wall 136 of the bushing 116, which delimits the bushing bore 119, also referred to as an inner contour, resembles an arc-shaped or curved course in the widening portion 131 such that a kind of champagne glass form is formed.

The bore 119 is further designed such that the wall thickness 124 of the bushing 116 decreases constantly on a percentage basis along the widening portion 131 in the direction of the second bushing end 118. The decrease corresponds to the modification in the diameter 132, that is to say for each consecutive distance unit 135 of the same length. For example, a wall thickness 124 of 0.6 or 0.8 mm is provided on the second bushing end 118, for instance in the further cylindrical portion 131a. It is true that this does contribute to a stress discontinuity in the bonding, but it does prevent cracking and breaking of the bushing 116 on the other hand, if said bushing becomes too thin and the wall thickness 124 decreases further.

The form of the bushing runout described makes possible the advantages and functions indicated above.

A chamfer 137 of 45° is optionally configured on the second bushing end 118.

FIG. 5 shows, in a superimposed manner, a shear stress flow K1 of the described bushing 116 in the bushing runout 128 and a shear stress flow K2 of a bushing, in which the bushing runout has a conical, that is to say linear, course. The two courses are shown schematically and are produced in the flange insert 113 under tensile loading along the bore longitudinal axis 120 (X-axis) in an operatively erected condition. It can be seen that the flow K1 is significantly flatter and more constant due to the optimized design and, in particular, no significant excessive increase in stresses occurs at the second bushing end 118.

FIG. 6 shows the second bushing end 118 having the bushing runout 128 and an auxiliary tool 142 arranged therein, as well as a sandblasting device 144 for treating the outer surface 140 of the bushing 116. The bushing runout 128 and, in particular, the further portion 131a, comprise a very small wall thickness 124. Said wall thickness can, for example, be only 0.8 mm or 0.6 mm or less in the further portion 131a. During surface treatment of the bushing 116 by sandblasting, initial turning or sherardizing, there is a risk that the bushing runout 128 bends inwardly in the further portion 131a. This can be remedied by an auxiliary tool 142 which is inserted from the second bushing end 118 into the bushing runout 128 and at least rests against the wall 136 in the further portion 131a. The auxiliary tool 142 comprises a tapered form and has a relatively high stiffness.

LIST OF REFERENCE NUMERALS

100 Wind turbine
101 Tower
102 Nacelle
103 Rotor
104 (Wind turbine) rotor blade
105 Rotor hub
106 Rotor blade root region
107 Transition region
108 Profile region
109 Pressure side
110 Suction side
111 Longitudinal extension direction
112 Rotor blade attachment
113 Flange insert
114 Laminate
115 Laminate
116 Bushing
117 First bushing end
118 Second bushing end
119 Bushing bore
120 Bore longitudinal axis
121 Outside diameter
122 First portion
123 Second portion
124 Wall thickness
125 Third portion
126 Inside diameter
127 Threaded portion
128 Bushing runout
129 Cylindrical portion
130 Radius portion
131 widening portion
131a Further portion
132 Diameter
133 Start
134 End
135 Segment
136 Wall
137 Chamfer
140 Surface
142 Auxiliary tool
144 Sandblasting device
150 Division point
151 Rotor blade segment on the blade root side
152 Rotor blade segment on the blade tip side
K1 Shear stress flow corresponding to a bushing according to the embodiment example of the invention
K2 Shear stress flow corresponding to a bushing from the prior art

The invention claimed is:

1. A bushing (116) for a wind turbine rotor blade (104), the bushing (116) comprising:
    a first bushing end (117) and an opposite second bushing end (118); and
    a bushing bore (119) which extends in a region between the first bushing end (117) and the second bushing end (118) and comprises a bore longitudinal axis (120);
    wherein, along the bore longitudinal axis (120) in the direction of the second bushing end (118),
    the bushing bore (119) comprises a threaded portion (127), and
    the bushing (116) comprises a bushing runout (128) that follows the threaded portion (127), said bushing runout comprising a widening portion (131) of the bushing bore (119), wherein the widening portion (131) forms at least 50% of the bushing runout (128), and wherein in the widening portion (131) a diameter (132) of the bushing bore (119) enlarges monotonically while an increase in diameter decreases monotonically in such a manner that the bushing runout (128) comprises an arc-shaped course along the entire length of the widening portion (131).

2. The bushing (116) according to claim 1, wherein the bushing (116) comprises, in the region of the widening portion (131), a constant outside diameter (121).

3. The bushing (116) according to claim 1, wherein the diameter (132) in the widening portion (131) enlarges in such a manner that a wall thickness (124) of the bushing (116) decreases constantly on a percentage basis along the widening portion (131) in the direction of the second bushing end (118).

4. The bushing (116) according to claim 1, wherein the diameter (132) in the widening portion (131) enlarges in such a manner that a cross-sectional area of the bushing (116) decreases constantly on a percentage basis along the widening portion (131) in the direction of the second bushing end (118).

5. The bushing (116) according to claim 1, wherein the widening portion (131) forms one of at least 60%, at least 70%, at least 80%, or at least 90%, of the bushing runout (128).

6. The bushing (116) according to claim 1, wherein a wall thickness (124) of the bushing (116) increases at least partially between the first bushing end (117) and the threaded portion (127).

7. The bushing (116) according to claim 1, wherein a circumferential chamfer (137) or a circumferential radius is configured on the second bushing end (118).

8. The bushing (116) according to claim 1, wherein the bushing (116) is produced in one piece.

9. The bushing (116) according to claim 1, wherein the bushing bore (119) extends continuously from the first bushing end (117) to the second bushing end (118).

10. A flange insert for a wind turbine rotor blade (104), comprising multiple bushings (116) arranged next to one another according to claim 1, wherein the bushings (116) are embedded in one or more laminate layers.

11. A wind turbine rotor blade (104), comprising a rotor blade attachment (112) having multiple bushings (116) arranged in a circle according to claim 1.

12. A wind turbine rotor blade (104), comprising a rotor blade segment having a connecting flange comprising multiple bushings (116) arranged next to one another according to claim 1.

13. A wind turbine (100), comprising a rotor (103) having one or more rotor blades (104) according to claim 1.

14. The bushing (116) according to claim 1, wherein the bushing (116) comprises, in the region of the bushing runout (128), a constant outside diameter (121).

\* \* \* \* \*